(12) United States Patent
Prakash et al.

(10) Patent No.: US 10,812,319 B1
(45) Date of Patent: Oct. 20, 2020

(54) CORRELATING OBJECT STATE CHANGES WITH APPLICATION PERFORMANCE

(71) Applicant: Cisco Technology, Inc., San Jose, CA (US)

(72) Inventors: Suresh Prakash, Tamil Nadu (IN); Rajneesh Kumar, Bharatpur (IN); Chandan Abhishek, Jharkhand (IN); Nidhi Mala, Bihar (IN); Bhuvneshwar Kumar, Bihar (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/535,348

(22) Filed: Aug. 8, 2019

(51) Int. Cl.
| | | |
|---|---|---|
| G06F 15/173 | (2006.01) | |
| H04L 12/24 | (2006.01) | |
| G06N 20/00 | (2019.01) | |
| G06F 11/34 | (2006.01) | |

(52) U.S. Cl.
CPC ...... *H04L 41/0631* (2013.01); *G06F 11/3409* (2013.01); *G06N 20/00* (2019.01); *H04L 41/046* (2013.01); *H04L 41/069* (2013.01)

(58) Field of Classification Search
CPC . H04L 41/0631; H04L 41/046; H04L 41/069; G06N 20/00; G06F 11/3409
See application file for complete search history.

(56) References Cited

U.S. PATENT DOCUMENTS

| | | |
|---|---|---|
| 6,529,948 B1 | 3/2003 | Bowman-Amuah |
| 8,175,863 B1 | 5/2012 | Ostermeyer et al. |
| 8,737,235 B2 | 5/2014 | Nandy et al. |
| 10,069,690 B2 | 9/2018 | Dragon et al. |
| 2004/0250261 A1* | 12/2004 | Huibregtse ............. G06F 9/542 719/318 |
| 2013/0332594 A1* | 12/2013 | Dvir ........................ G06F 11/00 709/224 |
| 2014/0324862 A1* | 10/2014 | Bingham ................ G06F 16/26 707/737 |
| 2015/0199252 A1 | 7/2015 | Ilangovan et al. |
| 2016/0226731 A1* | 8/2016 | Maroulis ............. G06F 11/3006 |
| 2018/0123922 A1* | 5/2018 | Nataraj ............... H04L 41/0631 |
| 2018/0276266 A1* | 9/2018 | Diwakar ............. G06F 11/3006 |
| 2019/0123973 A1* | 4/2019 | Jeuk ....................... G06F 9/5072 |

* cited by examiner

*Primary Examiner* — Philip B Tran
(74) *Attorney, Agent, or Firm* — Behmke Innovation Group LLC; James M. Behmke; James J. Wong

(57) ABSTRACT

In one embodiment, a controller determines one or more objects of a computer application to track, and instructs a monitoring system to track object state changes for the one or more objects during runtime of the computer application. As such, the controller then receives object state change information for the one or more objects tracked by the monitoring system, in addition to receiving application performance metrics related to the computer application during runtime from the monitoring system. The controller may then determine one or more application performance metric change events based on the received application performance metrics. According to the techniques herein, the controller may then correlate one or more particular object state changes of the object state change information with one or more correspondingly affected application performance metric change events, and may perform one or more reactive actions based on the correlating.

20 Claims, 8 Drawing Sheets

CORRELATING OBJECT STATE CHANGES WITH APPLICATION PERFORMANCE

TECHNICAL FIELD

The present disclosure relates generally to computer systems, and, more particularly, to correlating object state changes with application performance.

BACKGROUND

The Internet and the World Wide Web have enabled the proliferation of web services available for virtually all types of businesses. Due to the accompanying complexity of the infrastructure supporting the web services, it is becoming increasingly difficult to maintain the highest level of service performance and user experience to keep up with the increase in web services. For example, it can be challenging to piece together monitoring and logging data across disparate systems, tools, and layers in a network architecture. Moreover, even when data can be obtained, it is difficult to directly connect the chain of events and cause and effect.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
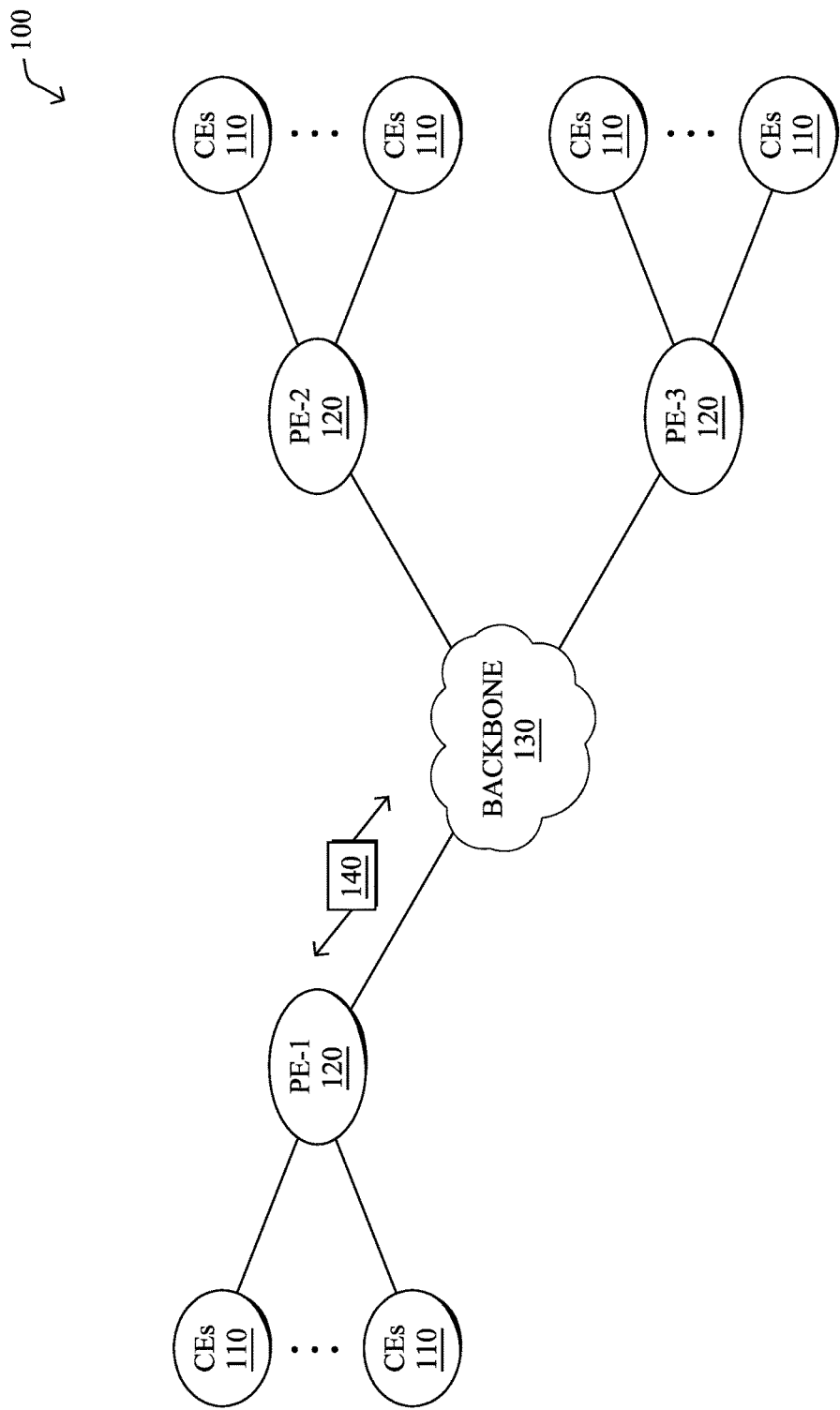
FIGS. 1A-1B illustrate an example computer network.

According to one or more embodiments of the disclosure, a controller determines one or more objects of a computer application to track, and instructs a monitoring system to track object state changes for the one or more objects during runtime of the computer application. As such, the controller then receives object state change information for the one or more objects tracked by the monitoring system, in addition to receiving application performance metrics related to the computer application during runtime from the monitoring system. The controller may then determine one or more application performance metric change events based on the received application performance metrics. According to the techniques herein, the controller may then correlate one or more particular object state changes of the object state change information with one or more correspondingly affected application performance metric change events, and may perform one or more reactive actions based on the correlating.

Other embodiments are described below, and this overview is not meant to limit the scope of the present disclosure.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network.

The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or power-line communication networks. That is, in addition to one or more sensors, each sensor device (node) in a sensor network may generally be equipped with a radio transceiver or other communication port, a microcontroller, and an energy source, such as a battery. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics.

Figure 1B:
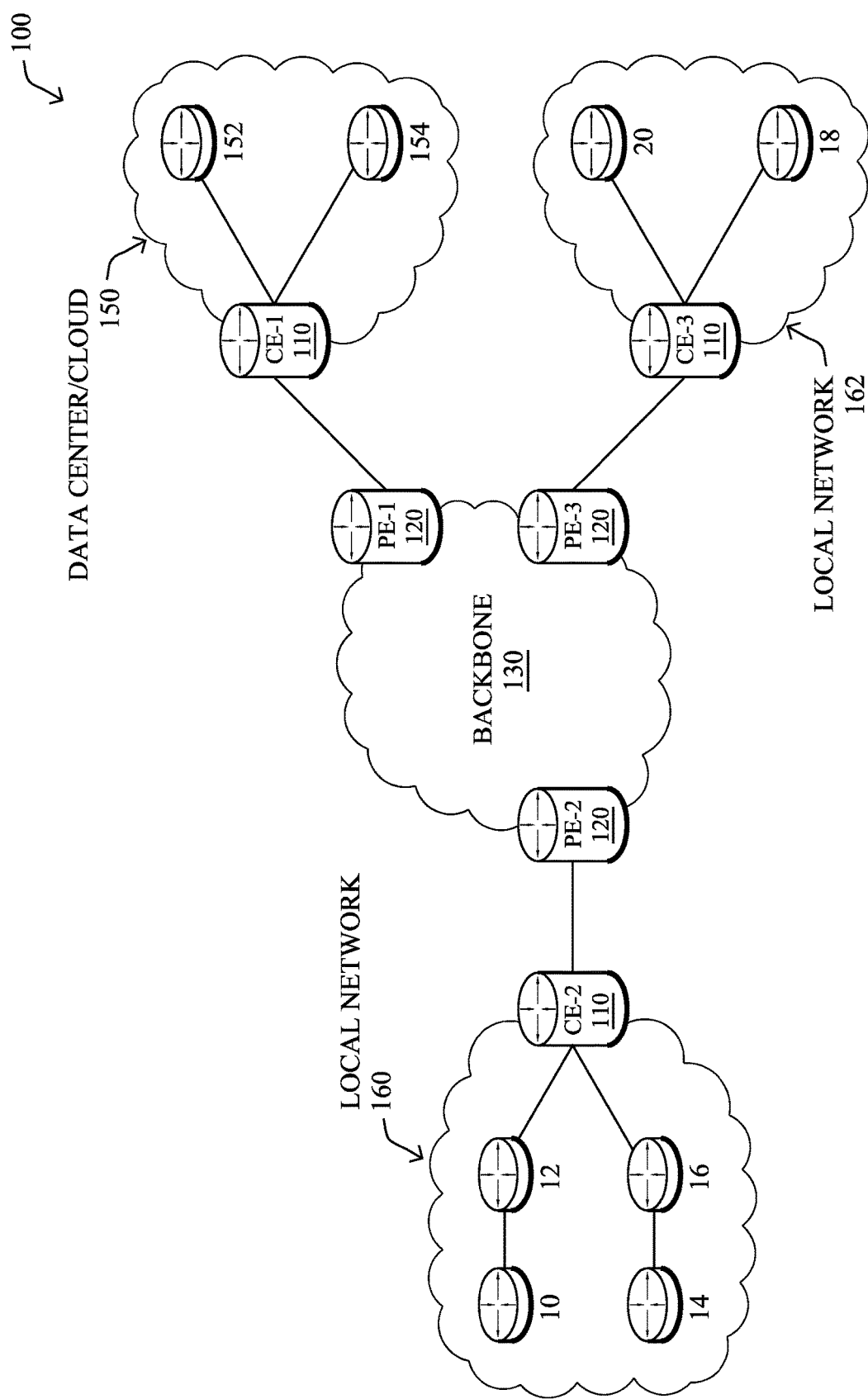

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations. Servers 152-154 may include, in various embodiments, any number of suitable servers or other cloud-based resources. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc. Furthermore, in various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
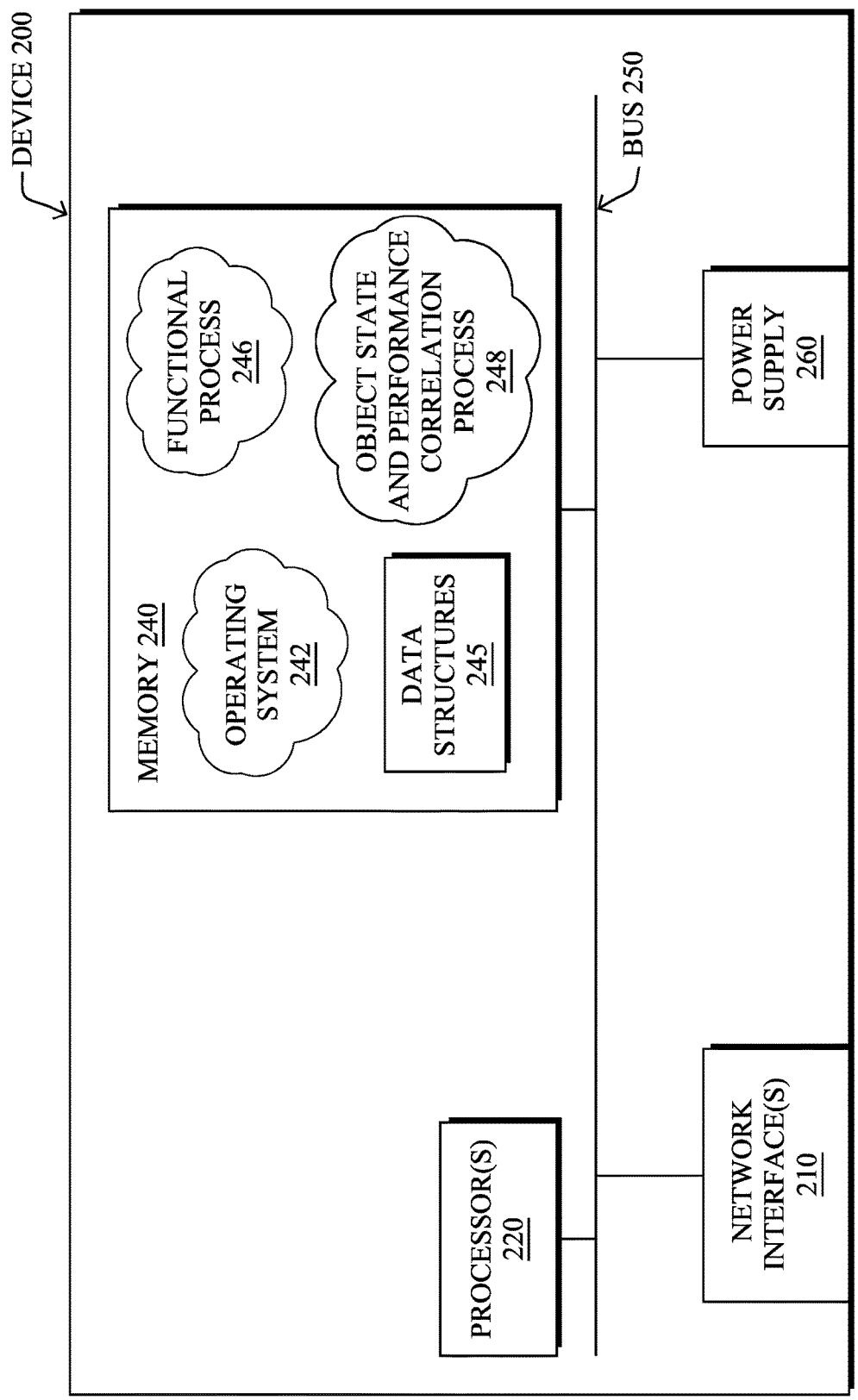
FIG. 2 illustrates an example computing device/node.

FIG. 2 is a schematic block diagram of an example computing device (e.g., apparatus) 200 that may be used with one or more embodiments described herein, e.g., as any of the devices shown in FIGS. 1A-1B above, and particularly as specific devices as described further below. The device may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100, e.g., providing a data connection between device 200 and the data network, such as the Internet. The network interfaces may be configured to transmit and/or receive data using a variety of different communication protocols. For example, interfaces 210 may include wired transceivers, wireless transceivers, cellular transceivers, or the like, each to allow device 200 to communicate information to and from a remote computing device or server over an appropriate network. The same network interfaces 210 also allow communities of multiple devices 200 to interconnect among themselves, either peer-to-peer, or up and down a hierarchy. Note, further, that the nodes may have two different types of network connections 210, e.g., wireless and wired/physical connections, and that the view herein is merely for illustration. Also, while the network interface 210 is shown separately from power supply 260, for devices using powerline communication (PLC) or Power over Ethernet (PoE), the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise one or more functional processes 246, and on certain devices, an illustrative "object state and performance correlation" process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

——Application Intelligence Platform——

The embodiments herein relate to an application intelligence platform for application performance management. In one aspect, as discussed with respect to FIGS. 3-5 below, performance within a networking environment may be monitored, specifically by monitoring applications and entities (e.g., transactions, tiers, nodes, and machines) in the networking environment using agents installed at individual machines at the entities. As an example, applications may be configured to run on one or more machines (e.g., a customer will typically run one or more nodes on a machine, where an application consists of one or more tiers, and a tier consists of one or more nodes). The agents collect data associated with the applications of interest and associated nodes and machines where the applications are being operated. Examples of the collected data may include performance data (e.g., metrics, metadata, etc.) and topology data (e.g., indicating relationship information). The agent-collected data may then be provided to one or more servers or controllers to analyze the data.

Figure 3:
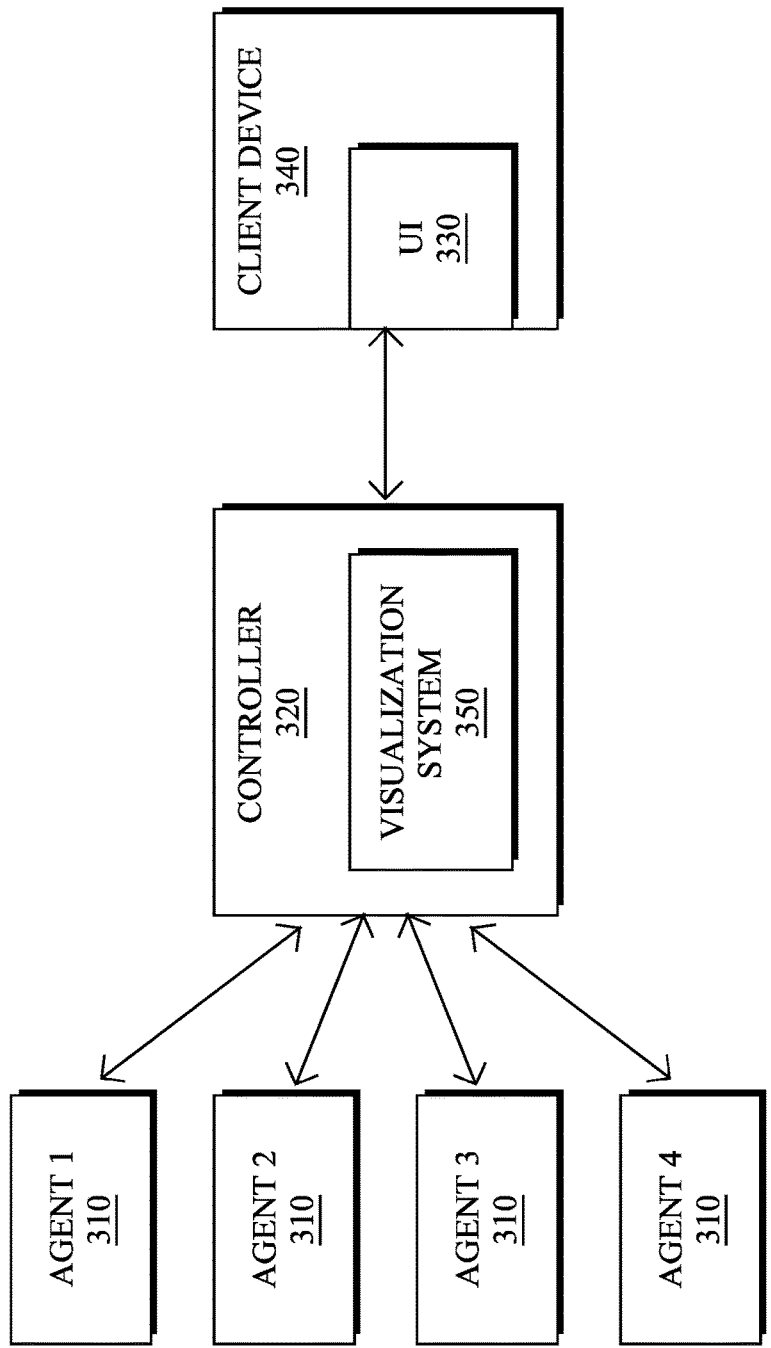
FIG. 3 illustrates an example application intelligence platform.

FIG. 3 is a block diagram of an example application intelligence platform 300 that can implement one or more aspects of the techniques herein. The application intelligence platform is a system that monitors and collects metrics of performance data for an application environment being monitored. At the simplest structure, the application intelligence platform includes one or more agents 310 and one or more servers/controllers 320. Note that while FIG. 3 shows four agents (e.g., Agent 1 through Agent 4) communicatively linked to a single controller, the total number of agents and controllers can vary based on a number of factors including the number of applications monitored, how distributed the application environment is, the level of monitoring desired, the level of user experience desired, and so on.

The controller 320 is the central processing and administration server for the application intelligence platform. The controller 320 serves a browser-based user interface (UI) 330 that is the primary interface for monitoring, analyzing, and troubleshooting the monitored environment. The controller 320 can control and manage monitoring of business transactions (described below) distributed over application servers. Specifically, the controller 320 can receive runtime data from agents 310 (and/or other coordinator devices), associate portions of business transaction data, communicate with agents to configure collection of runtime data, and provide performance data and reporting through the interface 330. The interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, a controller instance 320 may be hosted remotely by a provider of the application intelligence platform 300. In an illustrative on-premises (On-Prem) implementation, a controller instance 320 may be installed locally and self-administered.

The controllers 320 receive data from different agents 310 (e.g., Agents 1-4) deployed to monitor applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller. Database agents query the monitored databases in order to collect metrics and pass those metrics along for display in a metric browser (e.g., for database monitoring and analysis within databases pages of the controller's UI 330). Multiple database agents can report to the same controller. Additional database agents can be implemented as backup database agents to take over for the primary database agents during a failure or planned machine downtime. The additional database agents can run on the same machine as the primary agents or on different machines. A database agent can be deployed in each distinct network of the monitored environment. Multiple database agents can run under different user accounts on the same machine.

Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. A standalone machine agent has an extensible architecture (e.g., designed to accommodate changes).

End user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs. Notably, browser agents (e.g., agents 310) can include Reporters that report monitored data to the controller.

Monitoring through browser agents and mobile agents are generally unlike monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served, and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases.

A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Application Intelligence Monitoring: The disclosed technology can provide application intelligence data by monitoring an application environment that includes various services such as web applications served from an application server (e.g., Java virtual machine (JVM), Internet Information Services (IIS), Hypertext Preprocessor (PHP) Web server, etc.), databases or other data stores, and remote services such as message queues and caches. The services in the application environment can interact in various ways to provide a set of cohesive user interactions with the application, such as a set of user services applicable to end user customers.

Application Intelligence Modeling: Entities in the application environment (such as the JBoss service, MQSeries modules, and databases) and the services provided by the entities (such as a login transaction, service or product search, or purchase transaction) may be mapped to an application intelligence model. In the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

Business Transactions: A business transaction representation of the particular service provided by the monitored environment provides a view on performance data in the context of the various tiers that participate in processing a particular request. A business transaction, which may each be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one embodiment, a specific tag may be added to packets by application specific agents for identifying business transactions (e.g., a custom header field attached to a hypertext transfer protocol (HTTP) payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)).

Performance monitoring can be oriented by business transaction to focus on the performance of the services in the application environment from the perspective of end users. Performance monitoring based on business transactions can provide information on whether a service is available (e.g., users can log in, check out, or view their data), response times for users, and the cause of problems when the problems occur.

A business application is the top-level container in the application intelligence model. A business application contains a set of related services and business transactions. In some implementations, a single business application may be needed to model the environment. In some implementations, the application intelligence model of the application environment can be divided into several business applications. Business applications can be organized differently based on the specifics of the application environment. One consideration is to organize the business applications in a way that reflects work teams in a particular organization, since role-based access controls in the Controller UI are oriented by business application.

A node in the application intelligence model corresponds to a monitored server or JVM in the application environment. A node is the smallest unit of the modeled environment. In general, a node corresponds to an individual application server, JVM, or Common Language Runtime (CLR) on which a monitoring Agent is installed. Each node identifies itself in the application intelligence model. The Agent installed at the node is configured to specify the name of the node, tier, and business application under which the Agent reports data to the Controller.

Business applications contain tiers, the unit in the application intelligence model that includes one or more nodes. Each node represents an instrumented service (such as a web application). While a node can be a distinct application in the application environment, in the application intelligence model, a node is a member of a tier, which, along with possibly many other tiers, make up the overall logical business application.

Tiers can be organized in the application intelligence model depending on a mental model of the monitored application environment. For example, identical nodes can be grouped into a single tier (such as a cluster of redundant servers). In some implementations, any set of nodes, identical or not, can be grouped for the purpose of treating certain performance metrics as a unit into a single tier.

The traffic in a business application flows among tiers and can be visualized in a flow map using lines among tiers. In addition, the lines indicating the traffic flows among tiers can be annotated with performance metrics. In the application intelligence model, there may not be any interaction among nodes within a single tier. Also, in some implementations, an application agent node cannot belong to more than one tier. Similarly, a machine agent cannot belong to more than one tier. However, more than one machine agent can be installed on a machine.

A backend is a component that participates in the processing of a business transaction instance. A backend is not instrumented by an agent. A backend may be a web server, database, message queue, or other type of service. The agent recognizes calls to these backend services from instrumented code (called exit calls). When a service is not instrumented and cannot continue the transaction context of the call, the agent determines that the service is a backend component. The agent picks up the transaction context at the response at the backend and continues to follow the context of the transaction from there.

Performance information is available for the backend call. For detailed transaction analysis for the leg of a transaction processed by the backend, the database, web service, or other application need to be instrumented.

The application intelligence platform uses both self-learned baselines and configurable thresholds to help identify application issues. A complex distributed application has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed application intelligence platform can perform anomaly detection based on dynamic baselines or thresholds.

The disclosed application intelligence platform automatically calculates dynamic baselines for the monitored metrics, defining what is "normal" for each metric based on actual usage. The application intelligence platform uses these baselines to identify subsequent metrics whose values fall out of this normal range. Static thresholds that are tedious to set up and, in rapidly changing application environments, error-prone, are no longer needed.

The disclosed application intelligence platform can use configurable thresholds to maintain service level agreements (SLAs) and ensure optimum performance levels for system by detecting slow, very slow, and stalled transactions. Configurable thresholds provide a flexible way to associate the right business context with a slow request to isolate the root cause.

In addition, health rules can be set up with conditions that use the dynamically generated baselines to trigger alerts or initiate other types of remedial actions when performance problems are occurring or may be about to occur.

For example, dynamic baselines can be used to automatically establish what is considered normal behavior for a particular application. Policies and health rules can be used against baselines or other health indicators for a particular application to detect and troubleshoot problems before users are affected. Health rules can be used to define metric conditions to monitor, such as when the "average response time is four times slower than the baseline". The health rules can be created and modified based on the monitored application environment.

Examples of health rules for testing business transaction performance can include business transaction response time and business transaction error rate. For example, health rule that tests whether the business transaction response time is much higher than normal can define a critical condition as the combination of an average response time greater than the default baseline by 3 standard deviations and a load greater than 50 calls per minute. In some implementations, this health rule can define a warning condition as the combination of an average response time greater than the default baseline by 2 standard deviations and a load greater than 100 calls per minute. In some implementations, the health rule that tests whether the business transaction error rate is much higher than normal can define a critical condition as the combination of an error rate greater than the default baseline by 3 standard deviations and an error rate greater than 10 errors per minute and a load greater than 50 calls per minute. In some implementations, this health rule can define a warning condition as the combination of an error rate greater than the default baseline by 2 standard deviations and an error rate greater than 5 errors per minute and a load greater than 50 calls per minute. These are non-exhaustive and non-limiting examples of health rules and other health rules can be defined as desired by the user.

Policies can be configured to trigger actions when a health rule is violated or when any event occurs. Triggered actions can include notifications, diagnostic actions, auto-scaling capacity, running remediation scripts.

Most of the metrics relate to the overall performance of the application or business transaction (e.g., load, average response time, error rate, etc.) or of the application server infrastructure (e.g., percentage CPU busy, percentage of memory used, etc.). The Metric Browser in the controller UI can be used to view all of the metrics that the agents report to the controller.

In addition, special metrics called information points can be created to report on how a given business (as opposed to a given application) is performing. For example, the performance of the total revenue for a certain product or set of products can be monitored. Also, information points can be used to report on how a given code is performing, for example how many times a specific method is called and how long it is taking to execute. Moreover, extensions that use the machine agent can be created to report user defined custom metrics. These custom metrics are base-lined and reported in the controller, just like the built-in metrics.

All metrics can be accessed programmatically using a Representational State Transfer (REST) API that returns either the JavaScript Object Notation (JSON) or the eXtensible Markup Language (XML) format. Also, the REST API can be used to query and manipulate the application environment.

Snapshots provide a detailed picture of a given application at a certain point in time. Snapshots usually include call graphs that allow that enables drilling down to the line of code that may be causing performance problems. The most common snapshots are transaction snapshots.

Figure 4:
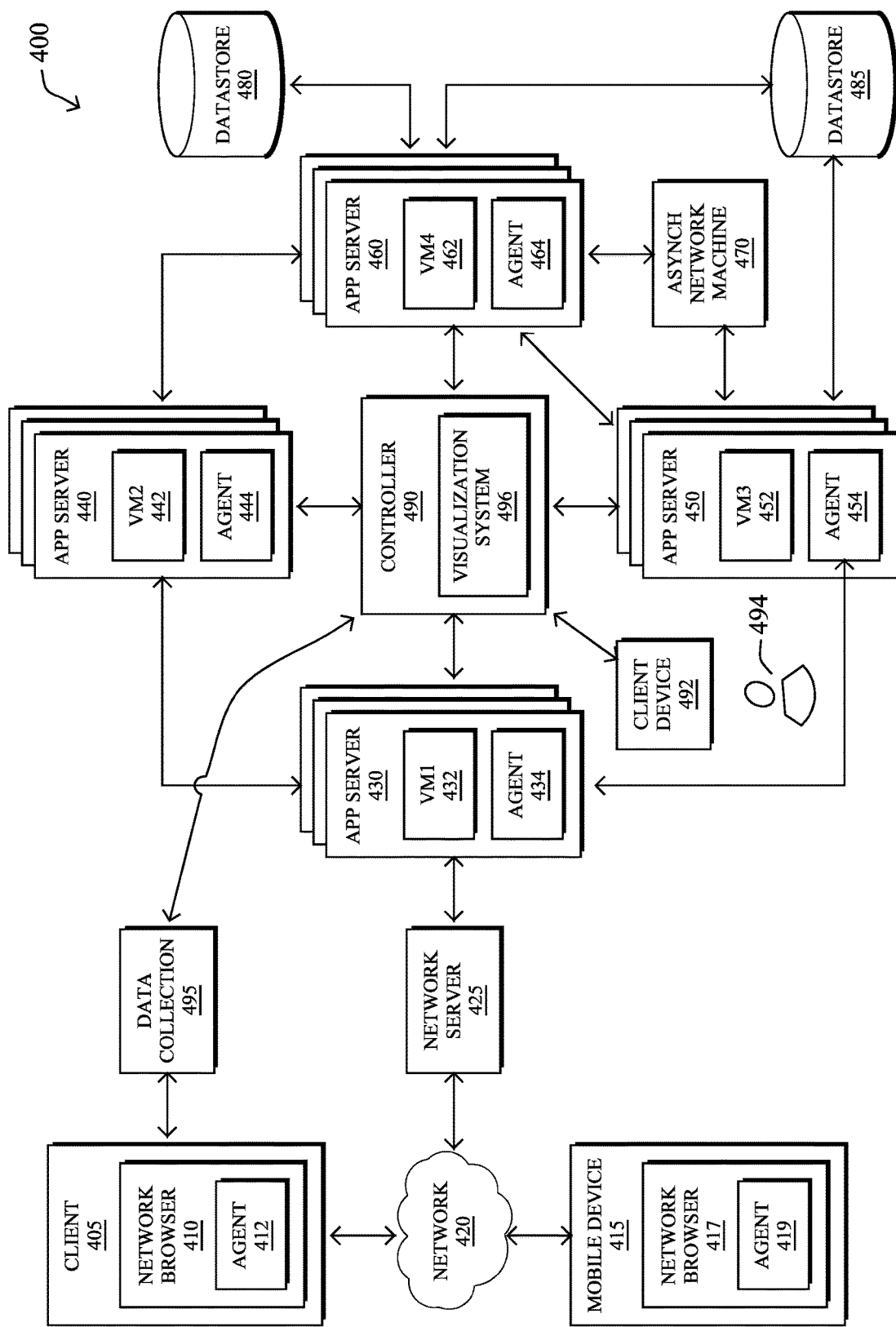
FIG. 4 illustrates an example system for implementing the example application intelligence platform.

FIG. 4 illustrates an example application intelligence platform (system) 400 for performing one or more aspects of the techniques herein. The system 400 in FIG. 4 includes client device 405 and 492, mobile device 415, network 420, network server 425, application servers 430, 440, 450, and 460, asynchronous network machine 470, data stores 480 and 485, controller 490, and data collection server 495. The controller 490 can include visualization system 496 for providing displaying of the report generated for performing the field name recommendations for field extraction as disclosed in the present disclosure. In some implementations, the visualization system 496 can be implemented in a separate machine (e.g., a server) different from the one hosting the controller 490.

Client device 405 may include network browser 410 and be implemented as a computing device, such as for example a laptop, desktop, workstation, or some other computing device. Network browser 410 may be a client application for viewing content provided by an application server, such as application server 430 via network server 425 over network 420.

Network browser 410 may include agent 412. Agent 412 may be installed on network browser 410 and/or client 405 as a network browser add-on, downloading the application to the server, or in some other manner. Agent 412 may be executed to monitor network browser 410, the operating system of client 405, and any other application, API, or another component of client 405. Agent 412 may determine network browser navigation timing metrics, access browser cookies, monitor code, and transmit data to data collection 495, controller 490, or another device. Agent 412 may perform other operations related to monitoring a request or a network at client 405 as discussed herein including report generating.

Mobile device 415 is connected to network 420 and may be implemented as a portable device suitable for sending and receiving content over a network, such as for example a mobile phone, smart phone, tablet computer, or other portable device. Both client device 405 and mobile device 415 may include hardware and/or software configured to access a web service provided by network server 425.

Mobile device 415 may include network browser 417 and an agent 419. Mobile device may also include client applications and other code that may be monitored by agent 419. Agent 419 may reside in and/or communicate with network browser 417, as well as communicate with other applications, an operating system, APIs and other hardware and software on mobile device 415. Agent 419 may have similar functionality as that described herein for agent 412 on client 405, and may report data to data collection server 495 and/or controller 490.

Network 420 may facilitate communication of data among different servers, devices and machines of system 400 (some connections shown with lines to network 420, some not shown). The network may be implemented as a private network, public network, intranet, the Internet, a cellular network, Wi-Fi network, VoIP network, or a combination of one or more of these networks. The network 420 may include one or more machines such as load balance machines and other machines.

Network server 425 is connected to network 420 and may receive and process requests received over network 420. Network server 425 may be implemented as one or more servers implementing a network service, and may be implemented on the same machine as application server 430 or one or more separate machines. When network 420 is the Internet, network server 425 may be implemented as a web server.

Application server 430 communicates with network server 425, application servers 440 and 450, and controller 490. Application server 450 may also communicate with other machines and devices (not illustrated in FIG. 4). Application server 430 may host an application or portions of a distributed application. The host application 432 may be in one of many platforms, such as including a Java, PHP, .Net, and Node.JS, be implemented as a Java virtual machine, or include some other host type. Application server 430 may also include one or more agents 434 (i.e., "modules"), including a language agent, machine agent, and network agent, and other software modules. Application server 430 may be implemented as one server or multiple servers as illustrated in FIG. 4.

Application 432 and other software on application server 430 may be instrumented using byte code insertion, or byte code instrumentation (BCI), to modify the object code of the application or other software. The instrumented object code may include code used to detect calls received by application 432, calls sent by application 432, and communicate with agent 434 during execution of the application. BCI may also be used to monitor one or more sockets of the application and/or application server in order to monitor the socket and capture packets coming over the socket.

In some embodiments, server 430 may include applications and/or code other than a virtual machine. For example, servers 430, 440, 450, and 460 may each include Java code, .Net code, PHP code, Ruby code, C code, C++ or other binary code to implement applications and process requests received from a remote source. References to a virtual machine with respect to an application server are intended to be for exemplary purposes only.

Agents 434 on application server 430 may be installed, downloaded, embedded, or otherwise provided on application server 430. For example, agents 434 may be provided in server 430 by instrumentation of object code, downloading the agents to the server, or in some other manner. Agent 434 may be executed to monitor application server 430, monitor code running in a virtual machine 432 (or other program language, such as a PHP, .Net, or C program), machine resources, network layer data, and communicate with byte instrumented code on application server 430 and one or more applications on application server 430.

Each of agents 434, 444, 454, and 464 may include one or more agents, such as language agents, machine agents, and network agents. A language agent may be a type of agent that is suitable to run on a particular host. Examples of language agents include a Java agent, .Net agent, PHP agent, and other agents. The machine agent may collect data from a particular machine on which it is installed. A network agent may capture network information, such as data collected from a socket.

Agent 434 may detect operations such as receiving calls and sending requests by application server 430, resource usage, and incoming packets. Agent 434 may receive data, process the data, for example by aggregating data into metrics, and transmit the data and/or metrics to controller 490. Agent 434 may perform other operations related to monitoring applications and application server 430 as discussed herein. For example, agent 434 may identify other applications, share business transaction data, aggregate detected runtime data, and other operations.

An agent may operate to monitor a node, tier of nodes, or other entity. A node may be a software program or a hardware component (e.g., memory, processor, and so on). A tier of nodes may include a plurality of nodes which may process a similar business transaction, may be located on the same server, may be associated with each other in some other way, or may not be associated with each other.

A language agent may be an agent suitable to instrument or modify, collect data from, and reside on a host. The host may be a Java, PHP, .Net, Node.JS, or other type of platform. Language agents may collect flow data as well as data associated with the execution of a particular application. The language agent may instrument the lowest level of the application to gather the flow data. The flow data may indicate which tier is communicating with which tier and on which port. In some instances, the flow data collected from the language agent includes a source IP, a source port, a destination IP, and a destination port. The language agent may report the application data and call chain data to a controller. The language agent may report the collected flow data associated with a particular application to a network agent.

A network agent may be a standalone agent that resides on the host and collects network flow group data. The network flow group data may include a source IP, destination port, destination IP, and protocol information for network flow received by an application on which network agent is installed. The network agent may collect data by intercepting and performing packet capture on packets coming in from one or more network interfaces (e.g., so that data generated/received by all the applications using sockets can be intercepted). The network agent may receive flow data from a language agent that is associated with applications to be monitored. For flows in the flow group data that match flow data provided by the language agent, the network agent rolls up the flow data to determine metrics such as TCP throughput, TCP loss, latency, and bandwidth. The network agent may then report the metrics, flow group data, and call chain data to a controller. The network agent may also make system calls at an application server to determine system information, such as for example a host status check, a network status check, socket status, and other information.

A machine agent, which may be referred to as an infrastructure agent, may reside on the host and collect information regarding the machine which implements the host. A machine agent may collect and generate metrics from information such as processor usage, memory usage, and other hardware information.

Each of the language agent, network agent, and machine agent may report data to the controller. Controller 490 may be implemented as a remote server that communicates with agents located on one or more servers or machines. The controller may receive metrics, call chain data and other data, correlate the received data as part of a distributed transaction, and report the correlated data in the context of a distributed application implemented by one or more monitored applications and occurring over one or more monitored networks. The controller may provide reports, one or more user interfaces, and other information for a user.

Agent 434 may create a request identifier for a request received by server 430 (for example, a request received by a client 405 or 415 associated with a user or another source). The request identifier may be sent to client 405 or mobile device 415, whichever device sent the request. In embodiments, the request identifier may be created when data is collected and analyzed for a particular business transaction.

Each of application servers 440, 450, and 460 may include an application and agents. Each application may run on the corresponding application server. Each of applications 442, 452, and 462 on application servers 440-460 may operate similarly to application 432 and perform at least a portion of a distributed business transaction. Agents 444, 454, and 464 may monitor applications 442-462, collect and process data at runtime, and communicate with controller 490. The applications 432, 442, 452, and 462 may communicate with each other as part of performing a distributed transaction. Each application may call any application or method of another virtual machine.

Asynchronous network machine 470 may engage in asynchronous communications with one or more application servers, such as application server 450 and 460. For example, application server 450 may transmit several calls or messages to an asynchronous network machine. Rather than communicate back to application server 450, the asynchronous network machine may process the messages and eventually provide a response, such as a processed message, to application server 460. Because there is no return message from the asynchronous network machine to application server 450, the communications among them are asynchronous.

Data stores 480 and 485 may each be accessed by application servers such as application server 460. Data store 485 may also be accessed by application server 450. Each of data stores 480 and 485 may store data, process data, and return queries received from an application server. Each of data stores 480 and 485 may or may not include an agent.

Controller 490 may control and manage monitoring of business transactions distributed over application servers 430-460. In some embodiments, controller 490 may receive application data, including data associated with monitoring client requests at client 405 and mobile device 415, from data collection server 495. In some embodiments, controller 490 may receive application monitoring data and network data from each of agents 412, 419, 434, 444, and 454 (also referred to herein as "application monitoring agents"). Controller 490 may associate portions of business transaction data, communicate with agents to configure collection of data, and provide performance data and reporting through an interface. The interface may be viewed as a web-based interface viewable by client device 492, which may be a mobile device, client device, or any other platform for viewing an interface provided by controller 490. In some embodiments, a client device 492 may directly communicate with controller 490 to view an interface for monitoring data.

Client device 492 may include any computing device, including a mobile device or a client computer such as a desktop, work station or other computing device. Client computer 492 may communicate with controller 490 to create and view a custom interface. In some embodiments, controller 490 provides an interface for creating and viewing the custom interface as a content page, e.g., a web page, which may be provided to and rendered through a network browser application on client device 492.

Applications 432, 442, 452, and 462 may be any of several types of applications. Examples of applications that may implement applications 432-462 include a Java, PHP, .Net, Node.JS, and other applications.

Figure 5:
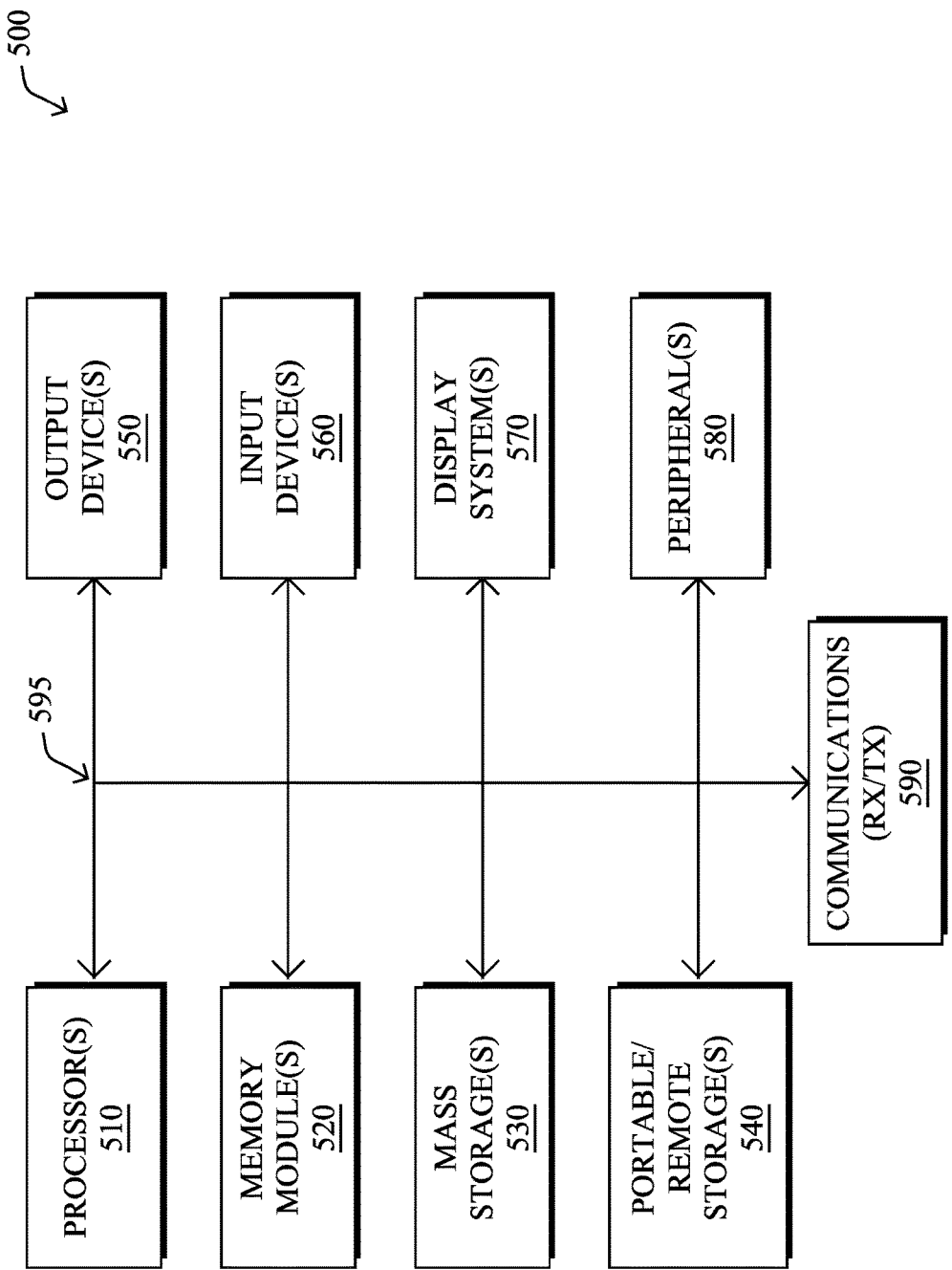
FIG. 5 illustrates an example computing system implementing the disclosed technology.

FIG. 5 is a block diagram of a computer system 500 for implementing the present technology, which is a specific implementation of device 200 of FIG. 2 above. System 500 of FIG. 5 may be implemented in the contexts of the likes of clients 405, 492, network server 425, servers 430, 440, 450, 460, asynchronous network machine 470, and controller 490 of FIG. 4. (Note that the specifically configured system 500 of FIG. 5 and the customized device 200 of FIG. 2 are not meant to be mutually exclusive, and the techniques herein may be performed by any suitably configured computing device.)

The computing system 500 of FIG. 5 includes one or more processors 510 and memory 520. Main memory 520 stores, in part, instructions and data for execution by processor 510. Main memory 520 can store the executable code when in operation. The system 500 of FIG. 5 further includes a mass storage device 530, portable storage medium drive(s) 540, output devices 550, user input devices 560, a graphics display 570, and peripheral devices 580.

The components shown in FIG. 5 are depicted as being connected via a single bus 590. However, the components may be connected through one or more data transport means. For example, processor unit 510 and main memory 520 may be connected via a local microprocessor bus, and the mass storage device 530, peripheral device(s) 580, portable or remote storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 can store the system software for implementing embodiments of the present disclosure for purposes of loading that software into main memory 520.

Portable storage device 540 operates in conjunction with a portable non-volatile storage medium, such as a compact disk, digital video disk, magnetic disk, flash storage, etc. to input and output data and code to and from the computer system 500 of FIG. 5. The system software for implementing embodiments of the present disclosure may be stored on such a portable medium and input to the computer system 500 via the portable storage device 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Examples of suitable output devices include speakers, printers, network interfaces, and monitors.

Display system 570 may include a liquid crystal display (LCD) or other suitable display device. Display system 570 receives textual and graphical information, and processes the information for output to the display device.

Peripherals 580 may include any type of computer support device to add additional functionality to the computer system. For example, peripheral device(s) 580 may include a modem or a router.

The components contained in the computer system 500 of FIG. 5 can include a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Apple OS, and other suitable operating systems, including mobile versions.

When implementing a mobile device such as smart phone or tablet computer, the computer system 500 of FIG. 5 may include one or more antennas, radios, and other circuitry for communicating over wireless signals, such as for example communication using Wi-Fi, cellular, or other wireless signals.

——Correlating Object State Changes with Application Performance——

As mentioned above, though application performance monitoring (APM) solutions provide a broad range of functionality, it can still be difficult to directly connect the chain of events and cause and effect. The techniques herein, however, provide for tracking and correlating object state changes with application performance monitoring. In particular, APM solutions today do not provide an easy way to track object state change history, despite the fact that a runtime state of an object holds important data from which many insights may be granted into the application. That is, a performance issue is often directly related to an object's state. For example, when an object is found to be in an inconsistent state, the history of that object's transformations would be helpful in identifying the root cause of the inconsistency. Integrating object tracking capabilities with application performance monitoring, and particularly correlating application performance with object value changes, thus provides many benefits over current solutions.

Specifically, according to one or more embodiments described herein, a controller determines one or more objects of a computer application to track, and instructs a monitoring system to track object state changes for the one or more objects during runtime of the computer application. As such, the controller then receives object state change information for the one or more objects tracked by the monitoring system, in addition to receiving application performance metrics related to the computer application during runtime from the monitoring system. The controller may then determine one or more application performance metric change events based on the received application performance metrics. According to the techniques herein, the controller may then correlate one or more particular object state changes of the object state change information with one or more correspondingly affected application performance metric change events, and may perform one or more reactive actions based on the correlating.

Notably, the techniques herein may employ any number of machine learning techniques, such as to identify trends and provide optimal configuration suggestions as described herein. In general, machine learning is concerned with the design and the development of techniques that receive empirical data as input (e.g., collected metric/event data from agents, sensors, etc.) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function is a function of the number of misclassified points. The learning process then operates by adjusting the parameters a,b,c such that the number of misclassified points is minimal. After this optimization/learning phase, the techniques herein can use the model M to classify new data points. Often, M is a statistical model, and the cost function is inversely proportional to the likelihood of M, given the input data.

One class of machine learning techniques that is of particular use herein is clustering. Generally speaking, clustering is a family of techniques that seek to group data according to some typically predefined or otherwise determined notion of similarity.

Also, the performance of a machine learning model can be evaluated in a number of ways based on the number of true positives, false positives, true negatives, and/or false negatives of the model.

In various embodiments, such techniques may employ one or more supervised, unsupervised, or semi-supervised machine learning models. Generally, supervised learning entails the use of a training set of data, as noted above, that is used to train the model to apply labels to the input data. On the other end of the spectrum are unsupervised techniques that do not require a training set of labels. Notably, while a supervised learning model may look for previously seen patterns that have been labeled as such, an unsupervised model may attempt to analyze the data without applying a label to it. Semi-supervised learning models take a middle ground approach that uses a greatly reduced set of labeled training data.

Example machine learning techniques that the techniques herein can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) artificial neural networks (ANNs) (e.g., for non-linear models), replicating reservoir networks (e.g., for non-linear models, typically for time series), random forest classification, or the like.

Figure 6:
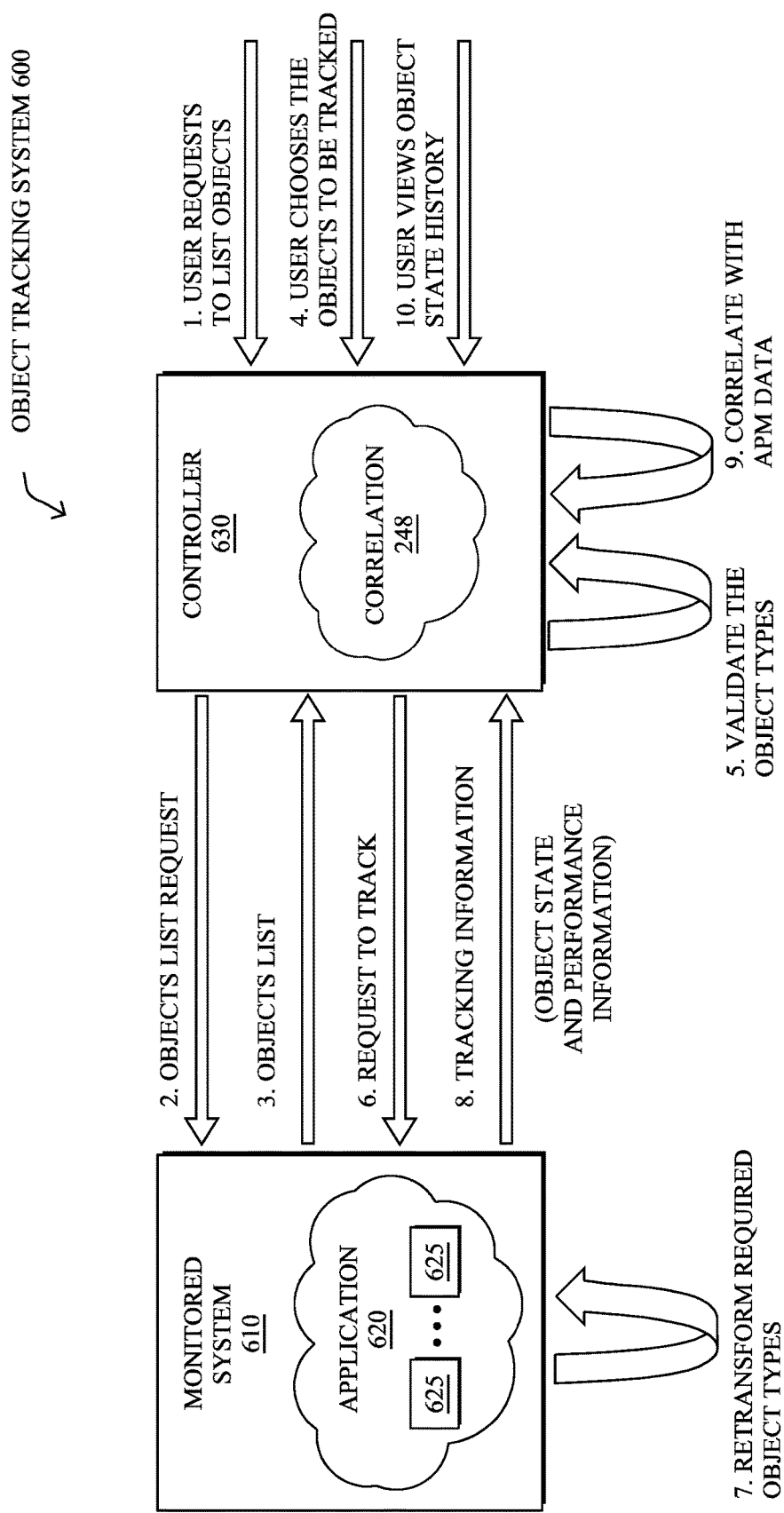
FIG. 6 illustrates an example simplified application environment (object tracking system) in accordance with one or more embodiments described herein.

Operationally, the techniques herein, which are described generally with reference to simplified application environment ("object tracking system") 600 of FIG. 6, comprises a monitored system 610, which may be any centralized or distributed system where an application 620 is running with one or more objects 625 that may be tracked, as described herein. For instance, the monitored system 610 may be any distributed or centralized application associated with an application intelligence platform as described above, such as, e.g., sales systems applications, financial transfer systems applications, inventory systems applications, database applications, social media applications, website applications, game applications, productivity applications, etc.

Notably, as will be readily understood by those skilled in the art (e.g., Java, .NET, etc.), an object (the Object class) is the parent/root class of all the classes. In other words, it is the topmost class of Java (i.e., every class has Object as a superclass) and it is the ultimate base class of all .NET classes (i.e., it is the root of the type hierarchy). A class is an entity that determines how an object will behave and what the object will contain, i.e., it is a blueprint or a set of instruction to build a specific type of object. Accordingly, an object is a self-contained component which consists of methods and properties to make a particular type of data useful. Objects determine the behavior of the class, and sending an application message to an object asks the object to invoke or execute one of its methods (an action which an object is able to perform). From a programming point of view, an object can be a data structure, a variable, or a function, and has a memory location allocated.

"Object state change", herein, therefore, is thus defined as any changes (modifications, adjustments, resetting, formatting, mutation, etc.) made to the state of any portion of an object or its subclasses, including settings, functions, variables, structures, definitions, and so on. For example, states of objects 625 of an application 620 may be used to define various limits (maximums or minimums), default values, URLs, and so on (e.g., cache sizes, time-to-live (TTL) counters, etc.).

Controller 630 is any system that facilitates the selection and correlation of tracked object state changes on the monitored system 610. For example, the controller 630 may be a centralized control interface for the monitored system, such as a server managing a plurality of distributed agents as described above for the application intelligence platform. The controller 630 may be configured to interact with a plurality of monitored systems 610 and/or a plurality of applications 620, and may either act autonomously, semi-autonomously, or under the direction of a user/admin (e.g., via a user interface, such as a graphical user interface or "GUI").

According to one or more embodiments of the techniques herein, the following illustrative steps, with reference still to FIG. 6, may be used to capture objects' lifecycle state changes during runtime of an application (i.e., from creation until garbage collection) of a monitored system 610, and to correlate this information with application performance monitoring data.

1. In one embodiment, a trigger, such as receiving a user request or an alarm/error condition, may initiate the process by the controller 630 to obtain a list of objects 625 for an application 620 of a monitored system 610.
2. The controller 630 may then send the request to the monitored system 610 to fetch the object list (objects 625). As noted above, any shared object, any class, etc., may be returned in this list.
3. The monitored system 610 sends back the list of objects 625 to the controller 630. Assume, for sake of discussion, that the object comprises cache size and TTL for the application 620.
4. The controller 630 may then select which particular objects 625 of the returned list to track (e.g., based on one or more criteria, user selection, or otherwise), such as all objects, certain objects, no objects, etc. The level of detail of the selection may also be any suitably configured granularity, such as the object as a whole (e.g., all classes within a particular object), or particular classes within the objects, and so on. The selection itself, when not manual, may be based on various selection criteria, such as random, based on which particular error/alarm triggered the monitoring, based on time of day, based on availability of resources, and any other configurable criteria of selection.
5. In one embodiment, the controller 630 may validate which selected objects are trackable, meaning certain objects may be hidden, protected, encrypted, have state changes that are not reflected by externally monitoring systems, or that otherwise cannot be tracked (e.g., due to resource limitations, local settings, and so on).
6. Once the selected object(s) are finalized, a request may be sent by the controller 630 to track the selected object(s) to the monitored system 610 (e.g., to one or more particular/relevant agents established to monitor the application 620, such as described above).
7. Object state information is then gathered by the monitored system 610, such as through retransformation of the object types. Note that in general, there isn't a way to "see" an object's state in the production environment without using an integrated development environment (IDE) on a local system. However, through the use of the application intelligence platform agents above, the techniques herein can track an object by tracking the methods which can modify any state of that object (e.g., mutator methods). That is, the object's state itself may not be able to be tracked, but changes to the object may be detected by monitoring the methods that may make the changes.
8. The tracked information is then sent/streamed to the controller 630, including both the tracked objects and their state changes ("object state"), as well as one or more application performance metrics ("performance information"), such as described above for the application intelligence platform. For example, application performance metrics may be any desired measure reflective of at least some portion of performance of an application, such as, e.g., latency, delay, error rates or counts, success rates or counts, retries, webpage load times, resource utilization and/or availability (e.g., memory, processor, bandwidth, etc.), and so on. Note that a timeline of object values may either be generated at the controller, or else by the agents and then sent as a collection of measurements to the controller.
9. According to the embodiments herein, the controller 630 may now correlate object state change with application performance. In particular, the techniques herein have the capability to correlate the tracked object data to performance changes (notably for better or worse, i.e., for performance improvements or for performance issues). For example, a reduction in cache size or a reduction in TTL may be correlated to a corresponding effect in the performance of the application (e.g., increase in delay or latency). As another example, an increase in average response time (ART) may arise when some object's state changes from X to Y. The techniques herein thus can be used to identify the object's state changes that particularly affect performance. Consider an object (that is being tracked), changing state from X to Y. By making this change an event that occurred at a certain time, this event can be correlated with a change in application performance metric (e.g., the Average Response Time) when that metric changes at or nearly after that particular event (e.g., plotting a graph between the object change event and performance metrics). In other words, if no performance is affected, then object state changes that occur at or nearly prior to that time, need not be correlated to any changes in performance, but when there is a change in performance, whether increasing or decreasing, this can be correlated to an object state change by looking for one or more object state change events that occur at or near (prior to) the same time. Note that when multiple object states change near the same time, a history of correlations may be used to determine a root cause of the affected performance metric. For example, after first determining that objects A and B both change their states at/near the same time to negatively affect a performance metric, the root cause can be determined to be object A's change when A alone changes the performance metric, and B alone does not. (Note that alternatively, A alone may not change the performance, and as such, the correlation would require that both A and B change at the same time in order to affect the performance.)

10. The correlation may then be used to trigger performance of some "reactive action", such as sharing the object state history with a user, generating one or more alarms, back-tracking (undoing) the change, suggesting to an administrative portal one or more objects to change to take corrective action, and so on. Note that in certain instances, certain affecting factors may take a longer time to create a correlated performance issue (e.g., reducing memory allocation may result, eventually, in overrun memory, extended delays, and so on). As such, the techniques herein may be configured to generate an alert condition in response to a future similar change to an object state, prior to an application performance issue.

Notably, the techniques herein may be used according to a number of monitoring configurations of different resources/entities on different types of monitored systems, for general monitoring, root cause analysis, and so on. For example, the techniques herein may apply to web applications, local programs, or other systems, such as databases (e.g., database failover based on correlations with connection objects).

In addition, the techniques herein can create policies for determining root causes of an issue. For instance, an ART health rule violation and an object state change event can be correlated when they are triggering a policy at the same point of time or within a time range. This will help in finding the root cause of the issue related to the object's state change.

According to one or more additional embodiments herein, various machine learning applications may be configured based on the correlations. For instance, anomaly detection may determine when object states change in ways that affect performance in unusual manners (e.g., after determining that this state change would not normally affect performance in that way), and so on. Also, machine learning can be used to suggest the appropriate changes to correct a problem, or, in certain embodiments, to configure optimal settings of object state (e.g., autonomously or as suggestions to an administrator) to achieve the best possible performance metrics (e.g., one or more objects individually, or a combination of state settings to result in the "best" performance of an application). In addition, machine learning may be used to automate tracked object selection, such as tracking all objects for an initial training period, and then only tracking those objects that are determined to be potentially affecting the performance. Also, the "granularity" of tracked objects, including the periodicity, classes within an object, number of devices or agents from which the changes and metrics are tracked, and so on.

Figure 7:
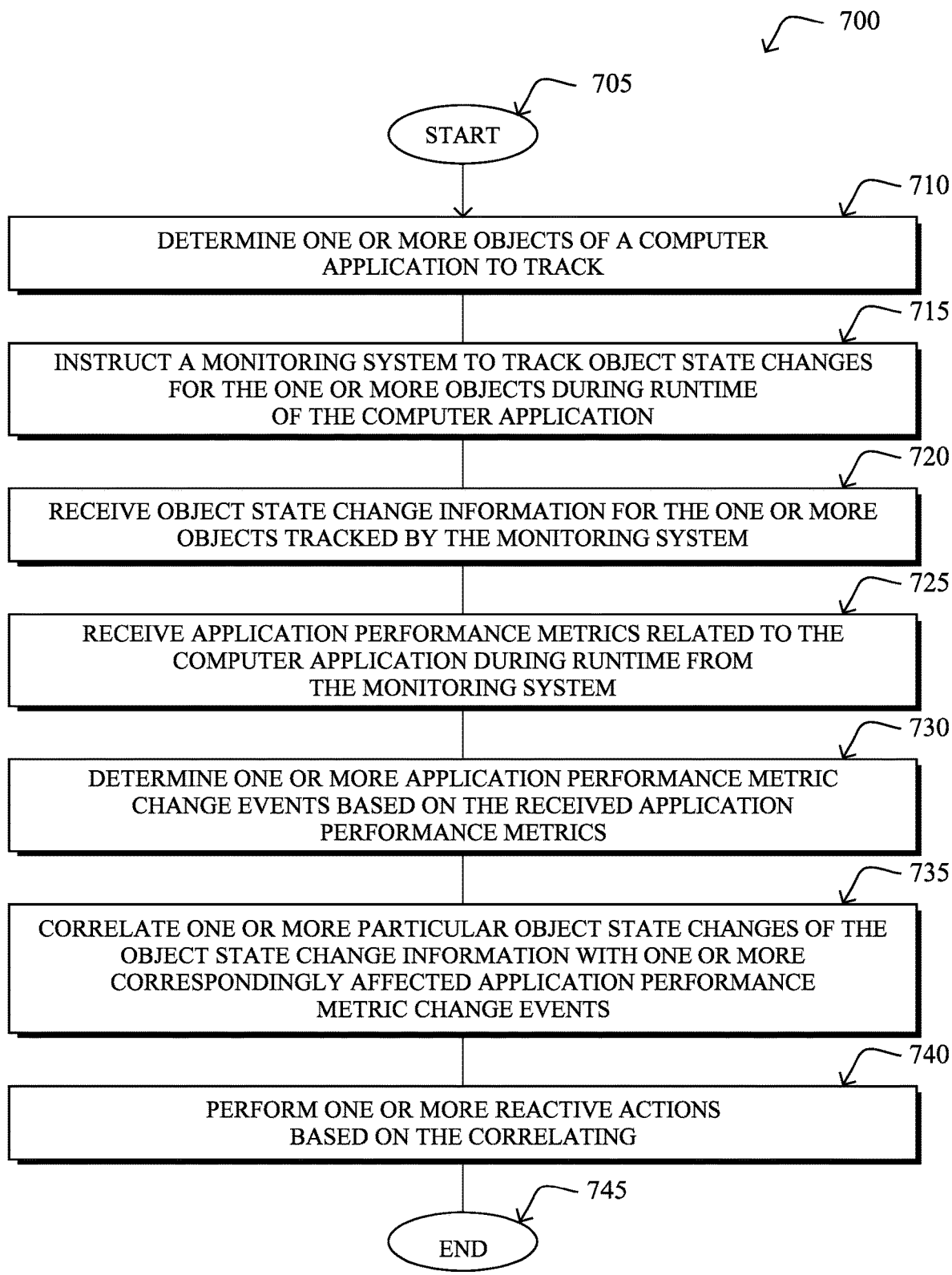
FIG. 7 illustrates an example simplified procedure for correlating object state changes with application performance in accordance with one or more embodiments described herein.

In closing, FIG. 7 illustrates an example simplified procedure for correlating object state changes with application performance in accordance with one or more embodiments described herein. For example, a non-generic, specifically configured device (e.g., device 200, particularly a controller 630 in collaboration with devices of a monitored system 610) may perform procedure 700 by executing stored instructions (e.g., process 248, such as a controller process or more specifically a correlation process). The procedure 700 may start at step 705, and continues to step 710, where, as described in greater detail above, a controller determines one or more objects 625 of a computer application 620 to track. For example, the controller may send a request (e.g., initiated by a user request or other trigger) to the monitoring system 610 to determine a list of objects in the computer application, such that in response to receiving the list of objects it can determine the one or more objects of a computer application to track by selecting the one or more objects from the list. In one embodiment, the controller may validate that the one or more objects selected from the list are trackable before determining to track the one or more objects. Also, in one embodiment, the controller may share the list with a user, and may receive user selection of the one or more objects of the computer application to track.

In step 715, the controller 630 may then instruct the monitoring system 610 to track object state changes for the one or more objects during runtime of the computer application. As such, in step 720, the controller may then begin receiving object state change information for the one or more objects tracked by the monitoring system (e.g., where object state changes are tracked through retransformation of an associated object type, as noted above).

In addition, in step 725, the controller receives application performance metrics related to the computer application during runtime from the monitoring system, and can determine, in step 730, one or more application performance metric change events based on the received application performance metrics. For example, an application performance metric change event may be based on a policy violation of the metric, or other threshold level of increase or decrease (which, notably, may be the same or different thresholds of change).

According to the techniques herein, in step 735 the controller may now correlate one or more particular object state changes of the object state change information with one or more correspondingly affected application performance metric change events. Specifically, as described in greater detail above, based on either timing (e.g., close to, at the same time, etc.), or based on additional determination of cause-and-effect between an object state change and resultant performance metric changes (increase or decrease), the techniques herein can effectively pair object state changes to performance metric changes. Note that in one embodiment, a plurality of particular object state changes may be correlated to a single correspondingly affected application performance metric change event. Conversely, a single particular object state change may be correlated to a plurality of correspondingly affected application performance metric change events.

Also, as mentioned above, the computer application may be a distributed application with a plurality of monitored system devices throughout a computer network. In one specific embodiment herein, particularly in relation to the application intelligence platform described above, the techniques herein may index the correlated one or more particular object state changes of the object state change information with one or more correspondingly affected application performance metric change events according to a particular business transaction identification. That is, the object may have been changed due to (or otherwise during) a particular business transaction, and/or the performance metrics may have changed during completion of a particular business transaction.

Accordingly, in step 740, the controller may perform one or more "reactive actions" based on the correlating. For instance, reactive actions are any configured, learned, or determined action that occurs in response to any correlation and/or in response to particular correlations, types of correlations, or other features of correlations (e.g., time, frequency, location, severity, etc.). Example reactive actions include, among others, such things as reporting and/or displaying the correlating (e.g., on a graphical user interface (GUI), as a listing, and so on), generating an alarm, determining (e.g., and suggesting and/or performing) one or more corrective actions for the correspondingly affected application performance metric change events, and so on. Other example reactive actions may include more autonomous actions, such as, e.g., undoing the one or more particular object state changes, changing a state of one or more objects, allocating one or more resources, load balancing one or more processes, etc. In one particular embodiment, a reactive action may be to determine, using a machine learning process, an optimal object state configuration based on the correlating. In such an embodiment, the optimal configuration may either be autonomously performed by the controller, or may be suggested for configuration by an administrator.

The simplified procedure 700 may then end in step 745, notably with the ability to continue ingesting and correlating data. Other steps may also be included generally within procedure 700. For example, such steps (or, more generally, such additions to steps already specifically illustrated above), may include: correlating a history of object state changes with one or more correspondingly affected application performance metric change events over time for root cause analysis; learning correlations between object state changes application performance metrics across a plurality of instances of the computer application within a computer network; and so on.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for correlating object state changes with application performance. In particular, the techniques herein go beyond mere parameter tracking (e.g., in terms of memory consumption, processor usage, etc.), specifically tracking changes made to object states during runtime of an application (e.g., from state "1" to state "2"), and dynamically correlating those changes to their effects on application performance (e.g., what happened to the performance because of the object changing to state "2"?). In this manner, additional embodiments herein may then be configured to report the effects, adjust the system based on the affects, provide suggestions based on machine learning to limit, mitigate, or even avoid detrimental effects, provide suggestions for object settings based on machine learning to provide optimal configurations based on the correlation to performance, and so on. No other current system provides this correlation, nor the additional benefits of the various embodiments described herein.

In still further embodiments of the techniques herein, a business impact of the object state changes can also be quantified. That is, because of issues related to specific applications/processes (e.g., lost traffic, slower servers, overloaded network links, etc.), various corresponding business transactions may have been correspondingly affected for those applications/processes (e.g., online purchases were delayed, page visits were halted before fully loading, user satisfaction or dwell time decreased, etc.), while other processes (e.g., on other network segments or at other times) remain unaffected. The techniques herein, therefore, can correlate the object state changes with various business transactions in order to better understand the effect on the business transactions, accordingly.

Illustratively, the techniques described herein may be performed by hardware, software, and/or firmware, such as in accordance with the illustrative object state and performance correlation process 248, which may include computer executable instructions executed by the processor 220 to perform functions relating to the techniques described herein, e.g., in conjunction with corresponding processes of other devices in the computer network as described herein (e.g., on network agents, controllers, computing devices, servers, etc.).

According to the embodiments herein, a method herein may comprise: determining, by a controller, one or more objects of a computer application to track; instructing, by the controller, a monitoring system to track object state changes for the one or more objects during runtime of the computer application; receiving, at the controller, object state change information for the one or more objects tracked by the monitoring system; receiving, at the controller, application performance metrics related to the computer application during runtime from the monitoring system; determining, by the controller, one or more application performance metric change events based on the received application performance metrics; correlating, by the controller, one or more particular object state changes of the object state change information with one or more correspondingly affected application performance metric change events; and performing, by the controller, one or more reactive actions based on the correlating.

In one embodiment, the method comprises correlating a history of object state changes with one or more correspondingly affected application performance metric change events over time for root cause analysis. In one embodiment, the method comprises correlating a plurality of particular object state changes to a single correspondingly affected application performance metric change event. In one embodiment, the reactive action is selected from a group consisting of: reporting the correlating; undoing the one or more particular object state changes; changing a state of one or more objects; generating an alarm; allocating one or more resources; load balancing one or more processes; displaying the correlating on a graphical user interface (GUI); and determining one or more corrective actions for the one or more correspondingly affected application performance metric change events. In one embodiment, the computer application is a distributed application with a plurality of monitored system devices throughout a computer network. In one specific instance of this embodiment, the method comprises indexing the correlated one or more particular object state changes of the object state change information with one or more correspondingly affected application performance metric change events according to a particular business transaction identification. In one embodiment, the method comprises sending a request to the monitoring system to determine a list of objects in the computer application; receiving the list of objects; and determining the one or more objects of a computer application to track by selecting the one or more objects from the list. In one specific instance of this embodiment, the method comprises validating that the one or more objects selected from the list are trackable before determining to track the one or more objects. In one embodiment, the method comprises receiving user selection of the one or more objects of the computer application to track. In one embodiment, object state changes are tracked through retransformation of an associated object type. In one embodiment, the method comprises learning correlations between object state changes application performance metrics across a plurality of instances of the computer application within a computer network. In one embodiment, an application performance metric change event is based on a policy violation of the metric. In one embodiment, the method comprises determining, using a machine learning process, an optimal object state configuration based on the correlating.

According to the embodiments herein, a tangible, non-transitory, computer-readable medium herein may have computer-executable instructions stored thereon that, when executed by a processor on a computer, may cause the computer to perform a method comprising: determining one or more objects of a computer application to track; instructing a monitoring system to track object state changes for the one or more objects during runtime of the computer application; receiving object state change information for the one or more objects tracked by the monitoring system; receiving application performance metrics related to the computer application during runtime from the monitoring system; determining one or more application performance metric change events based on the received application performance metrics; correlating one or more particular object state changes of the object state change information with one or more correspondingly affected application performance metric change events; and performing one or more reactive actions based on the correlating.

Further, according to the embodiments herein an apparatus herein may comprise: one or more network interfaces to communicate with a network; a processor coupled to the network interfaces and configured to execute one or more processes; and a memory configured to store a process executable by the processor, the process, when executed, configured to: determine one or more objects of a computer application to track; instruct a monitoring system to track object state changes for the one or more objects during runtime of the computer application; receive object state change information for the one or more objects tracked by the monitoring system; receive application performance metrics related to the computer application during runtime from the monitoring system; determine one or more application performance metric change events based on the received application performance metrics; correlate one or more particular object state changes of the object state change information with one or more correspondingly affected application performance metric change events; and perform one or more reactive actions based on the correlating.

While there have been shown and described illustrative embodiments above, it is to be understood that various other adaptations and modifications may be made within the scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as Java, TCP, IP, and so on, other suitable technologies, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any embodiment or of what may be claimed, but rather as descriptions of features that may be specific to particular embodiments of particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure are described in terms of being performed "by a server" or "by a controller", those skilled in the art will appreciate that agents of the application intelligence platform (e.g., application agents, network agents, language agents, etc.) may be considered to be extensions of the server (or controller) operation, and as such, any process step performed "by a server" need not be limited to local processing on a specific server device, unless otherwise specifically noted as such. Furthermore, while certain aspects are described as being performed "by an agent" or by particular types of agents (e.g., application agents, network agents, etc.), the techniques may be generally applied to any suitable software/hardware configuration (libraries, modules, etc.) as part of an apparatus or otherwise.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
    determining, by a controller, one or more objects of a computer application to track;
    instructing, by the controller, a monitoring system to track object state changes for the one or more objects during runtime of the computer application;
    receiving, at the controller, object state change information for the one or more objects tracked by the monitoring system;
    receiving, at the controller, application performance metrics related to the computer application during runtime from the monitoring system;
    determining, by the controller, one or more application performance metric change events based on the received application performance metrics;
    correlating, by the controller, one or more particular object state changes of the object state change information with one or more correspondingly affected application performance metric change events; and
    performing, by the controller, one or more reactive actions based on the correlating.

2. The method as in claim 1, further comprising:
    correlating a history of object state changes with one or more correspondingly affected application performance metric change events over time for root cause analysis.

3. The method as in claim 1, wherein the one or more object state changes comprise a plurality of particular object state changes, the method further comprising:
    correlating the plurality of particular object state changes to a single correspondingly affected application performance metric change event.

4. The method as in claim 1, wherein the reactive action is selected from a group consisting of: reporting the correlating; undoing the one or more particular object state changes; changing a state of one or more objects; generating an alarm; allocating one or more resources; load balancing one or more processes; displaying the correlating on a graphical user interface (GUI); and determining one or more corrective actions for the one or more correspondingly affected application performance metric change events.

5. The method as in claim 1, wherein the computer application is a distributed application with a plurality of monitored system devices throughout a computer network.

6. The method as in claim 5, further comprising:
    indexing the correlated one or more particular object state changes of the object state change information with one or more correspondingly affected application performance metric change events according to a particular business transaction identification.

7. The method as in claim 1, further comprising:
    sending a request to the monitoring system to determine a list of objects in the computer application;
    receiving the list of objects; and
    determining the one or more objects of a computer application to track by selecting the one or more objects from the list.

8. The method as in claim 7, further comprising:
    validating that the one or more objects selected from the list are trackable before determining to track the one or more objects.

9. The method as in claim 1, further comprising:
    receiving user selection of the one or more objects of the computer application to track.

10. The method as in claim 1, wherein object state changes are tracked through retransformation of an associated object type.

11. The method as in claim 1, further comprising:
    learning correlations between object state changes application performance metrics across a plurality of instances of the computer application within a computer network.

12. The method as in claim 1, wherein an application performance metric change event is based on a policy violation of the metric.

13. The method as in claim 1, further comprising:
    determining, using a machine learning process, an optimal object state configuration based on the correlating.

14. A tangible, non-transitory, computer-readable medium having computer-executable instructions stored thereon that, when executed by a processor on a computer, cause the computer to perform a method comprising:
    determining one or more objects of a computer application to track;
    instructing a monitoring system to track object state changes for the one or more objects during runtime of the computer application;
    receiving object state change information for the one or more objects tracked by the monitoring system;
    receiving application performance metrics related to the computer application during runtime from the monitoring system;
    determining one or more application performance metric change events based on the received application performance metrics;
    correlating one or more particular object state changes of the object state change information with one or more correspondingly affected application performance metric change events; and
    performing one or more reactive actions based on the correlating.

15. The computer-readable medium as in claim 14, wherein the method further comprises:
    correlating a history of object state changes with one or more correspondingly affected application performance metric change events over time for root cause analysis.

16. The computer-readable medium as in claim 14, wherein the one or more object state changes comprise a plurality of particular object state changes, wherein the method further comprises:
    correlating the plurality of particular object state changes to a single correspondingly affected application performance metric change event.

17. The computer-readable medium as in claim 14, wherein the reactive action is selected from a group consisting of: reporting the correlating; undoing the one or more particular object state changes; changing a state of one or more objects; generating an alarm; allocating one or more resources; load balancing one or more processes;
    displaying the correlating on a graphical user interface (GUI); and determining one or more corrective actions for the one or more correspondingly affected application performance metric change events.

18. The computer-readable medium as in claim 14, wherein the computer application is a distributed application with a plurality of monitored system devices throughout a computer network.

19. The computer-readable medium as in claim 14, wherein the method further comprises:
   sending a request to the monitoring system to determine a list of objects in the computer application;
   receiving the list of objects; and
   determining the one or more objects of a computer application to track by selecting the one or more objects from the list.

20. An apparatus, comprising:
   one or more network interfaces to communicate with a network;
   a processor coupled to the network interfaces and configured to execute one or more processes; and
   a memory configured to store a process executable by the processor, the process, when executed, configured to:
   determine one or more objects of a computer application to track;
   instruct a monitoring system to track object state changes for the one or more objects during runtime of the computer application;
   receive object state change information for the one or more objects tracked by the monitoring system;
   receive application performance metrics related to the computer application during runtime from the monitoring system;
   determine one or more application performance metric change events based on the received application performance metrics;
   correlate one or more particular object state changes of the object state change information with one or more correspondingly affected application performance metric change events; and
   perform one or more reactive actions based on the correlating.

* * * * *